United States Patent [19]

Hahn

[11] Patent Number: 4,641,430
[45] Date of Patent: Feb. 10, 1987

[54] NUT SPLITTER

[75] Inventor: Marlin D. Hahn, San Angelo, Tex.

[73] Assignee: Texan Nut Sheller Pecan Company, San Angelo, Tex.

[21] Appl. No.: 808,646

[22] Filed: Dec. 13, 1985

[51] Int. Cl.[4] ............................................. A47J 43/26
[52] U.S. Cl. .................................. 30/120.5; 30/120.4; 99/579
[58] Field of Search ................ 30/120.1, 120.2, 120.3, 30/120.4, 120.5; 17/75; 99/571, 578, 579, 583

[56] References Cited

U.S. PATENT DOCUMENTS

| | | | |
|---|---|---|---|
| 627,401 | 6/1899 | Edwards | 30/120.4 |
| 1,192,846 | 8/1916 | Boyer | 30/120.5 |
| 1,205,276 | 11/1916 | Sharp et al. | 30/120.5 |
| 1,225,484 | 5/1917 | Payne | 30/120.5 |
| 1,445,532 | 2/1923 | Merriam | 99/583 |
| 1,499,653 | 7/1924 | Hagadorn | 30/120.4 |
| 1,543,797 | 6/1925 | Sciortino | 99/579 |
| 2,502,700 | 4/1950 | Capewell | 30/102 |
| 2,725,774 | 12/1955 | Tekse | 30/102 |
| 3,338,281 | 8/1967 | Davy | 30/120.4 |
| 4,255,855 | 3/1981 | Brazil | 30/120.5 |

FOREIGN PATENT DOCUMENTS 124861 2/1901 Fed. Rep. of Germany ..... 30/120.5

Primary Examiner—Jimmy O. Peters
Attorney, Agent, or Firm—Charles D. Gunter, Jr.

[57] ABSTRACT

A nut splitter is shown which includes a base for supporting the splitter upon a planar surface. A jaw having a cutting wheel rotatably mounted thereon is pivotally mounted on the base and is movable between an open position allowing placement of a nut on the base and a closed position in which the cutting wheel of the jaw contacts a nut. A lever arm has a pivot end which is pivotally attached to the jaw and an oppositely extending length which terminates in a free end which forms a handle for applying force to the jaw to move the jaw between the open and closed positions. An elongate bar is pivotally attached at one end to a point intermediate the pivot end and free end of the lever arm and has an opposite end which abuts a stop on the base, whereby the bar serves as a fulcrum point for the lever arm in applying force to the jaw.

5 Claims, 5 Drawing Figures

NUT SPLITTER

BACKGROUND OF THE INVENTION

1. Field of the Invention:

The present invention relates to nut opening devices and, specifically, to a nut splitter which is especially adapted for opening macadamia nuts.

2. Description of the Prior Art:

The macadamia tree is native to Australia and is also grown in New Zealand and Hawaii. The macadamia tree is characterized by small white flowers and an edible nut-like seed or fruit. The macadamia nut has a hard, generally spherical outer shell which contains a loose white meat similar in consistency to the Brazil nut.

Although various types of nut crackers are known in the prior art, none of these crackers are known by applicant to utilize a cutting disk to split the nut. Rather, the prior art devices have tended to have serrated jaws which are moved together to crack the nut being opened.

The present invention has as its object the provision of a nut splitter for macadamia nuts which utilizes a disk-like cutting element for splitting the nut shell.

Another object of the invention is the provision of such a nut splitter which operates by means of a double lever principle to advantageously apply force to the cutting element to split the nut.

SUMMARY OF THE INVENTION

The objects of the present invention are met by a nut splitter which includes a base for supporting the splitter upon a planar surface. The nut splitter also includes a jaw having a cutting wheel which is rotatably mounted on the jaw. The jaw is pivotally mounted on the base and is movable between an open position allowing placement of a nut on the base and a closed position in which the cutting surface of the jaw contacts the nut. A lever arm has a pivot end which is pivotally attached to the jaw and has an oppositely extending length which terminates in a free end which forms a handle for applying force to the jaw to move the jaw between the open and closed positions. An elongate bar is pivotally attached at one end to a point intermediate the pivot end and free end of the lever arm and has an opposite end which abuts a stop on the base, whereby the bar serves as a fulcrum point for the lever arm in applying force to the jaw.

Additional objects, features and advantages will be apparent in the written description which follows.

DETAILED DESCRIPTION OF THE INVENTION

Figure 1:
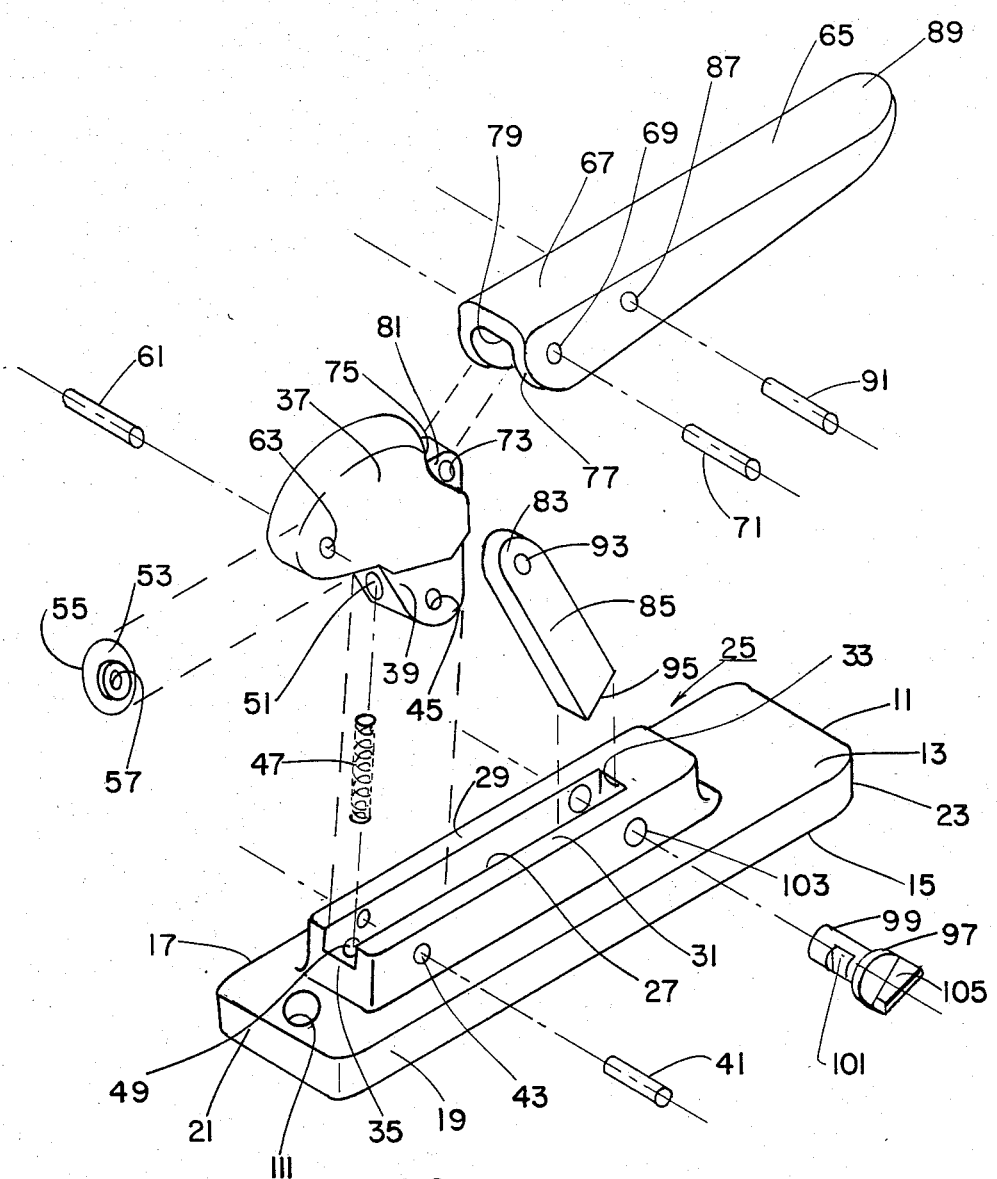
FIG. 1 is an exploded view of the nut splitter of the invention.

As shown in FIG. 1, the nut splitter of the invention includes a base 11 for supporting the splitter upon a planar surface, such as a table top, or the like. The base 11 has a top surface 13, a bottom surface 15, opposing sides 17, 19, and opposing ends 21, 23.

The base 11 also has a raised region designated generally as 25 which has an opening in the upper surface thereof which defines an elongate slot 27. The slot 27 is defined between side walls 29, 31 of the raised region 25, end wall 33, and a step region 35. The step region 35 is approximately half the height of the side walls 29, 31 and end wall 33.

A jaw 37 is pivotally mounted on the base 11 by means of a tongue region 39 which is received within the slot 27 and which is retained in position by a pin 41 which passes through aligned openings 43 in the raised region 25 and through a corresponding bore 45 in the jaw 37. A biasing means, such as coil spring 47 is located between an opening 49 in the step region 35 and an opening 51 in the jaw 37 for biasing the jaw toward an open position, as will be explained.

Figure 2:
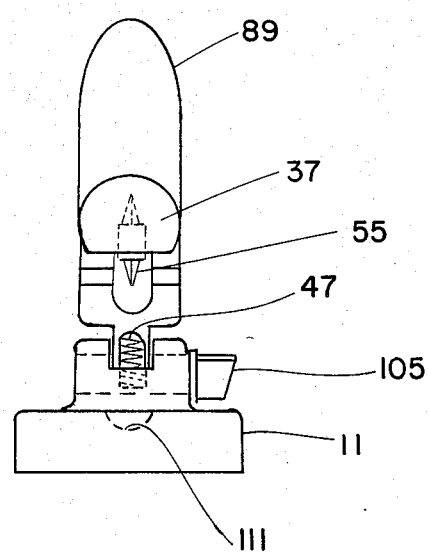
FIG. 2 is a front end view of the assembled nut splitter of the invention.

The jaw also has a cutting surface in the form of a cutting wheel 53 rotatably mounted thereon. The cutting wheel 53 is preferably a generally planar disk having a circumferential cutting edge 55 and a central bore 57. As shown in FIGS. 1 and 2, the cutting wheel 53 is received within an opening in the lower face 59 of the jaw 37 and is rotatably mounted on a pin 61 which passes through a transverse opening 63 in the jaw 37 and through the central bore 57 of the cutting wheel 53.

A lever arm 65 has a pivot end 67 which is pivotally attached to the jaw 37 at a pivot point 69 by means of a pin 71 which extends through the point 69 and through a bore 73 provided in the jaw 37. As shown in FIG. 1, the jaw 37 has a cam region defined by a sloping surface 75 which is arranged to contact a mating cam surface 77 of the lever arm 65 when the nut splitter is assembled.

The lever arm 65 has a longitudinal channel 79 on the underside thereof which receives a region of lesser relative thickness 81 of the jaw 37 and which also receives one end 83 of an elongate bar 85 which is pivotally attached at a point intermediate the pivot end 67 and free end 89 of the lever arm 65. The elongate bar 85 can be pivotally mounted within the channel 79 of the lever arm 65 by means of a pin 91 which extends through transverse openings 87 in the lever arm 65 and through a mating opening 93 in the bar 85.

The elongate bar 85 also has an opposite end 95 which is received within the elongate slot 27 in the base 11 and which abuts a stop, such as bolt 97 shown in FIG. 1. In this way, the elongate bar 85 serves as a fulcrum point for the lever arm 65 in applying force through the cam surfaces 75, 77 to move the jaw 37 from the open to the closed position.

The bolt 97 has a generally cylindrical shaft 99 with a groove 101 on one side thereof. The shaft 99 is received within transversely aligned openings 103 in the raised region 25 of the base and the shaft is rotatable by means of a knob 105 which protrudes from the opening 103. By rotating the groove 101 into or out of contact with the bar end 95, the position of the stop can be varied within the slot 27 and, in turn, the angle which the elongate bar forms with respect to the base can be varied for accommodating nuts of varying sizes.

Figure 3:
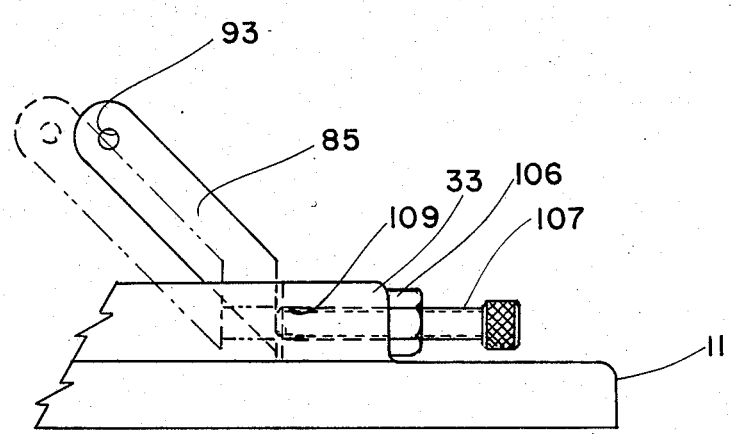
FIG. 3 is a partial, side view of another embodiment of the adjustable stop of the nut splitter of FIG. 1.

FIG. 3 shows another embodiment of the adjustment means for the stop of the invention. In this embodiment, a nut 106 is affixed to the base end region 33 and a bolt 107 passes through the nut 106 into a bore 109 of the base. The bore 109 is located in the end wall 33 of the raised region 25, with the bolt aligned with the slot 27.

By varying the position of the bolt 107, the position of the elongate bar 85 can be varied, as illustrated in dotted lines in FIG. 3.

Moving the bar 85 from the initial position in FIG. 3 to the position shown in dotted lines causes the cam surfaces 75, 77 to rotate the cutting wheel 53 in the direction of the depression 111 (FIG. 1) on the base 11 which holds a nut to be cracked. By properly setting the adjustment means for the stop, force applied to the lever arm 65 will cause the cutting wheel 53 to split the macadamia nut shell with the blade penetrating the nut shell but without penetrating the meat of the nut. Typically, the nut shell divides into two generally symmetrical halves and the nut meat can be extracted in one piece. This action prevents the shell from being crushed into small fragments or damage to the meat of the nut.

Figure 4:
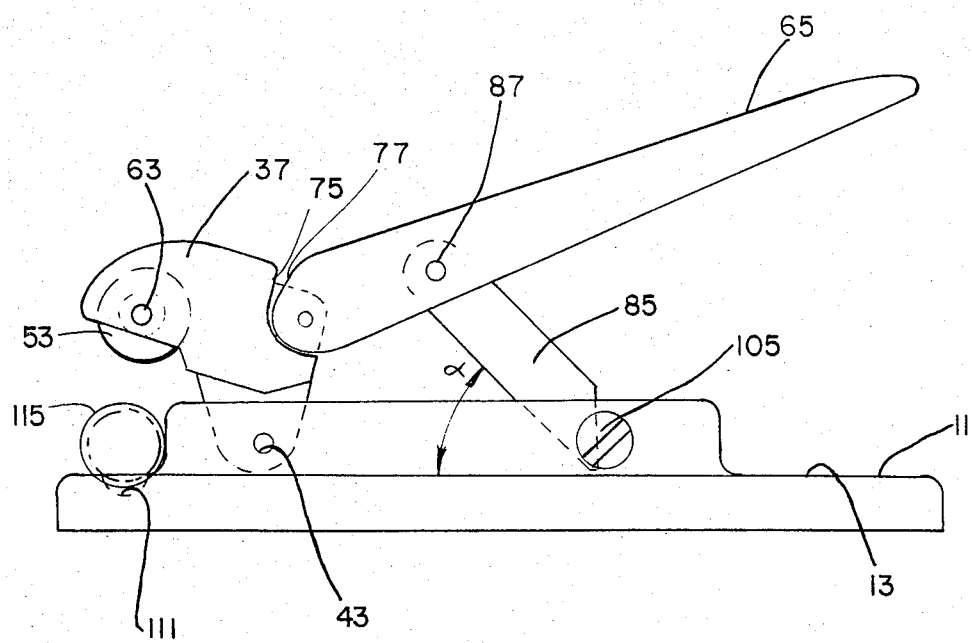
FIG. 4 is a side, perspective view of the nut splitter of the invention in the open position.
Figure 5:
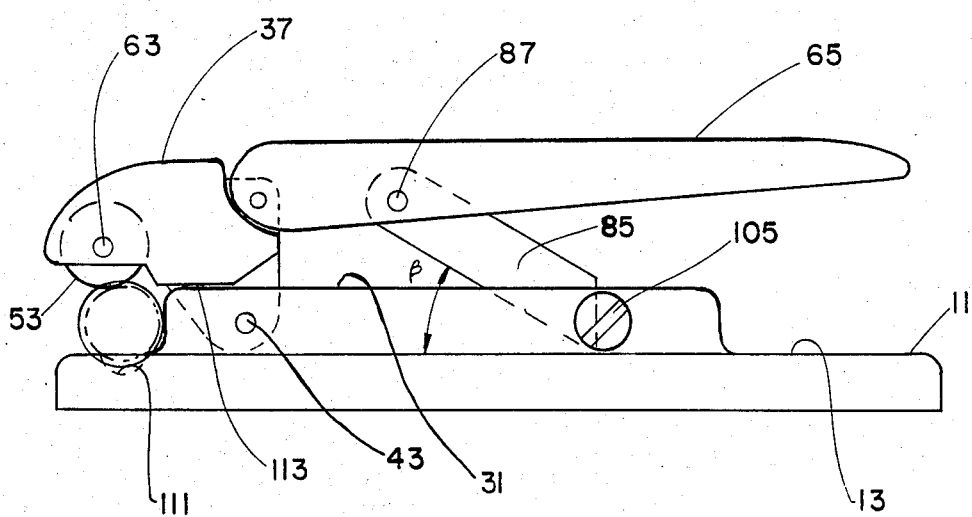
FIG. 5 is a side, perspective view of the nut splitter of the invention in the closed position.

The operation of the nut splitter of the invention can best be understood with reference to FIGS. 4 and 5. The generally spherical macadamia nut 115 is first placed in the depression 11 on the base 11. The jaw 37 is in the open position with the elongate bar 85 forming an angle alpha of approximately 45° with respect to the top surface 13 of the base 11. Force is then applied to the lever arm 65 whereby the point 87 moves in an arcuate path to the position shown in FIG. 5. Simultaneously, contact between the cam surfaces 75, 77 causes the jaw 37 to pivot about the point 43 until the shoulder 113 contacts the side wall 31. At this point, the cutting wheel 53 has penetrated the hard outer shell of the nut 115 without crushing the shell or damaging the fruit (shown in dotted lines in FIGS. 4 and 5). By adjusting the position of the bar 85 within the base slot, as by turning knob 105, the open position of the jaw can be varied, which allows the device to be used with nuts or varying dimensions.

An invention has been provided with several advantages. The nut splitter of the invention is simple in design and economical to manufacture. The double-lever, fulcrum action of the device multiplies the force applied to the lever. The novel cutting wheel of the jaw of the device splits a macadamia nut and allows the meat to be extracted without cracking the shell or damaging the meat. The adjustment means for the stop of the device allows the distance between the cutting wheel and nut to be varied for splitting nuts of varying sizes.

While the invention has been shown in only two of its forms, it is not thus limited, but is susceptible to various changes and modifications without departing from the spirit thereof.

I claim:

1. A nut splitter, comprising:
   a base for supporting the splitter upon a planar surface;
   a jaw having a cutting wheel rotatably mounted thereon, the jaw being pivotally mounted on the base and being movable between an open position allowing placement of a nut on the base and a closed position in which the cutting wheel contacts the nut;
   a lever arm having a pivot end which is pivotally attached to the jaw and an opposite length terminating in a free end which forms a handle for applying force to the jaw to move the jaw between the open and closed positions;
   an elongate bar pivotally attached at one end to a point intermediate the pivot end and free end of the lever arm and having an opposite end which abuts a stop on the base, whereby the bar serves as a fulcrum point for the lever arm in applying force to the jaw; and
   wherein the jaw has a cam region defined by an external sloping surface and wherein the lever arm has a mating cam surface comprising an external sloping surface on the pivot end thereof arranged to make rolling contact with the cam region of the jaw so that movement of the lever arm about the fulcrum point serves to move the cutting wheel into contact with the nut.

2. The nut splitter of claim 1, further comprising:
   a slot provided in the base for receiving the free end of the elongate bar, the stop being provided within the slot whereby the elongate bar forms a selected angle with respect to the base; and
   adjustment means provided within the slot for varying the position of the stop within the slot and, in turn, the angle the elongate bar forms with respect to the base for varying the size of the jaw opening to accommodate nuts of varying sizes.

3. The nut splitter of claim 2, wherein the adjustment means is a bolt having external threads, the bolt being received within a mating bore provided within the base, the bolt being arranged in alignment with the slot.

4. A nut splitter, comrpising:
   a base for supporting the splitter upon a planar surface;
   a jaw having a cutting wheel rotatably mounted thereon, the jaw being pivotally mounted on the base and being movable between an open position allowing placement of a nut on the base and a closed position in which the cutting wheel contacts the nut;
   a lever arm having a pivot end which is pivotally attached to the jaw and an opposite length terminating in a free end which forms a handle for applying force to the jaw to move the jaw between the open and closed positions;
   an elongate bar pivotally attached at one end to a point intermediate the pivot end and free end of the lever arm and having an opposite end which abuts a stop on the base, whereby the bar serves as a fulcrum point for the lever arm in applying force to the jaw;
   wherein the jaw has a cam surface thereon and wherein the lever arm has a mating cam surface so that movement of the lever arm about the fulcrum point serves to move the cutting wheel into contact with the nut;
   a slot provided in the base for receiving the free end of the elongate bar, the stop being provided within the slot whereby the elongate bar forms a selected angle with respect to the base;
   adjustment means provided within the slot for varying the position of the stop within the slot and, in turn, the angle the elongate bar forms with respect to the base for varying the size of the jaw opening to accommodate nuts of varying sizes; and
   wherein the adjustment means is a grooved bolt which is rotatably received within the slot perpendicular to the longitudinal axis of the slot.

5. A nut splitter, comprising:
   a base for supporting the splitter upon a planar surface;
   a jaw having a cutting wheel rotatably mounted thereon, the jaw being pivotally mounted on the base and being movable between an open position allowing placement of a nut on the base and a closed position in which the cutting wheel contacts the nut;

a lever arm having a pivot end which is pivotally attached to the jaw and an opposite length terminating in a free end which forms a handle for applying force to the jaw to move the jaw between the open and closed positions;

an elongate bar pivotally attached at one end to a point intermediate the pivot end and free end of the lever arm and having an opposite end which abuts a stop on the base, whereby the bar serves as a fulcrum point for the lever arm in applying force to the jaw;

wherein the jaw has a cam surface thereon and wherein the lever arm has a mating cam surface so that movement of the lever arm about the fulcrum point serves to move the cutting wheel into contact with the nut;

a slot provided in the base for receiving the free end of the elongate bar, the stop being provided within the slot whereby the elongate bar forms a selected angle with respect to the base;

adjustment means provided within the slot for varying the position of the stop within the slot and, in turn, the angle the elongate bar forms with respect to the base for varying the size of the jaw opening to accommodate nuts of varying sizes; and biasing means located between the base and the jaw for normally biasing the jaw toward the open position.

* * * * *